United States Patent
Watanabe et al.

(10) Patent No.: US 11,566,526 B2
(45) Date of Patent: Jan. 31, 2023

(54) VIBRATION DAMPING DEVICE FOR BLADE OF ROTATING MACHINE AND ROTATING MACHINE INCLUDING THE SAME

(71) Applicant: MITSUBISHI HEAVY INDUSTRIES AERO ENGINES, LTD., Komaki (JP)

(72) Inventors: Toshio Watanabe, Tokyo (JP); Kentaro Akimoto, Komaki (JP)

(73) Assignee: MITSUBISHI HEAVY INDUSTRIES AERO ENGINES, LTD., Komaki (JP)

( * ) Notice: Subject to any disclaimer, the term of this patent is extended or adjusted under 35 U.S.C. 154(b) by 57 days.

(21) Appl. No.: 17/284,560

(22) PCT Filed: Jul. 25, 2019

(86) PCT No.: PCT/JP2019/029259
§ 371 (c)(1),
(2) Date: Apr. 12, 2021

(87) PCT Pub. No.: WO2020/090169
PCT Pub. Date: May 7, 2020

(65) Prior Publication Data
US 2021/0317744 A1    Oct. 14, 2021

(30) Foreign Application Priority Data
Nov. 1, 2018    (JP) .............................. JP2018-206239

(51) Int. Cl.
*F01D 5/16*    (2006.01)
*F01D 5/18*    (2006.01)
*F01D 25/06*    (2006.01)

(52) U.S. Cl.
CPC ................ *F01D 5/16* (2013.01); *F01D 5/18* (2013.01); *F01D 25/06* (2013.01);
(Continued)

(58) Field of Classification Search
None
See application file for complete search history.

(56) References Cited

U.S. PATENT DOCUMENTS 9,879,551 B2 * 1/2018 Blaney ...................... F01D 5/18
10,247,005 B2 * 4/2019 Hartung .................. F01D 9/041
(Continued)

FOREIGN PATENT DOCUMENTS

DE    102016204255 A1    9/2017
EP       1074762 A2    2/2001
(Continued)

OTHER PUBLICATIONS

PCT, "International Search Report for International Application No. PCT/JP2019/029259," dated Sep. 10, 2019.
(Continued)

*Primary Examiner* — Kayla McCaffrey
(74) *Attorney, Agent, or Firm* — Manabu Kanesaka; Benjamin Hauptman; Kenneth Berner

(57) ABSTRACT

A vibration damping device according to an embodiment is a vibration damping device for a blade of a rotating machine, which includes at least one housing configured to be containable in a cavity formed under a platform of the blade, and to be detachable from the blade, and an attenuation material disposed in a vibration damping space formed inside the housing.

4 Claims, 14 Drawing Sheets

(52) U.S. Cl.
CPC .... *F05D 2220/323* (2013.01); *F05D 2240/80* (2013.01); *F05D 2260/96* (2013.01)

(56) References Cited

U.S. PATENT DOCUMENTS

| | | | |
|---|---|---|---|
| 2015/0052898 | A1 | 2/2015 | Erno et al. |
| 2015/0361801 | A1* | 12/2015 | Blaney ................... F01D 5/16 416/232 |
| 2016/0010462 | A1 | 1/2016 | Stiehler et al. |
| 2016/0138401 | A1* | 5/2016 | Hartung ................ F01D 9/041 415/119 |
| 2016/0146041 | A1 | 5/2016 | Hartung et al. |
| 2017/0067487 | A1 | 3/2017 | Hartung et al. |
| 2017/0314397 | A1 | 11/2017 | Hartung et al. |
| 2019/0128120 | A1 | 5/2019 | Hartung |

FOREIGN PATENT DOCUMENTS

| | | |
|---|---|---|
| EP | 1980715 A1 | 10/2008 |
| EP | 2484870 A1 | 8/2012 |
| EP | 2966262 A1 | 1/2016 |
| EP | 3020922 A1 | 5/2016 |
| EP | 3023584 A1 | 5/2016 |
| EP | 3138996 A1 | 3/2017 |
| EP | 3239461 A1 | 11/2017 |
| EP | 3477048 A1 | 5/2019 |
| FR | 3058767 A1 | 5/2018 |
| JP | 2015-148284 A | 8/2015 |
| JP | 2015-148287 A | 8/2015 |
| JP | 2016-528440 A | 9/2016 |
| JP | 6278448 B2 | 2/2018 |

OTHER PUBLICATIONS

PCT, "International Preliminary Report on Patentability for International Application No. PCT/JP2019/029259," dated May 14, 2021.

Europe Patent Office, "Search Report for European Patent Application No. 19879672.4," dated Oct. 18, 2021.

* cited by examiner

VIBRATION DAMPING DEVICE FOR BLADE OF ROTATING MACHINE AND ROTATING MACHINE INCLUDING THE SAME

RELATED APPLICATIONS

The present application is National Phase of International Application No. PCT/JP2019/029259 filed Jul. 25, 2019, and claims priority from Japanese Application No. 2018-206239, filed Nov. 1, 2018, the disclosure of which is hereby incorporated by reference herein in its entirety.

TECHNICAL FIELD

The present disclosure relates to a vibration damping device for a blade of a rotating machine and the rotating machine including the same.

BACKGROUND

In recent years, it is required to suppress a vibration of a blade associated with a rotation of a rotating machine (such as an aircraft engine or a gas turbine).

For example, in a component described in Patent Document 1, a vibration of a blade of a gas turbine is suppressed by embedding a cavity where a vibration damper is encapsulated in the blade.

CITATION LIST

Patent Literature

Patent Document 1: JP2016-528440A (translation of a PCT application)

SUMMARY

Technical Problem

However, as the component described in Patent Document 1, in the case in which the vibration damper is encapsulated in the cavity formed in the blade of the rotating machine, the blade is increased in thickness. Thus, application to a rotating machine, which is required of downsizing, may be difficult. Moreover, the vibration damper encapsulated in the cavity of the blade may not easily be replaceable even if deteriorated.

Thus, in view of the above, an object of some embodiments of the present invention is to provide a vibration damping device for the blade of the rotating machine which is space-saving and easily replaceable, and the rotating machine including the same.

Solution to Problem (1) A vibration damping device according to at least one embodiment of the present invention is a vibration damping device for a blade of a rotating machine, which includes at least one housing configured to be containable in a cavity formed under a platform of the blade, and to be detachable from the blade, and an attenuation material disposed in a vibration damping space formed inside the housing.

With the above configuration (1), it is possible to install the vibration damping device under the platform of the blade where a space is easily ensured, making it possible to save a space.

Moreover, even if the vibration damping device is deteriorated by heat and the like from the rotating machine, it is possible to replace the housing in its entirety which is installed in the cavity formed under the platform of the blade, allowing easy replacement. Thus, with the above configuration (1), it is possible to provide the vibration damping device for the blade of the rotating machine which is space-saving and easily replaceable.

(2) In some embodiments, in the above configuration (1), the housing includes a space formed in the housing independently from the vibration damping space, and the attenuation material is selectively disposed in the vibration damping space of the housing.

With the above configuration (2), including the space, where the attenuation material is not disposed, in the housing of the vibration damping device, it is possible to reduce the weight of the vibration damping device.

(3) In some embodiments, in the above configuration (1) or (2), the housing further includes a heavy member made of a material higher in density than the attenuation material, and configured to be detachable from the housing.

With the above configuration (3), since the heavy member is configured to be detachable from the housing, it is possible to suppress flutter by adjusting the natural frequency of each blade of the rotating machine by changing the heavy member (so-called mistuning).

Thus, with the above configuration (3), in addition to an effect of attenuating the vibration of the blade by the attenuation material, it is also possible to obtain an effect of suppressing flutter by mistuning with the heavy material.

(4) In some embodiments, in any one of the above configurations (1) to (3), the housing is configured to extend along a chordwise direction of the blade, and the vibration damping space is formed in at least one of a region on a leading-edge side or a region on a trailing-edge side of the blade of an interior space of the housing.

With the above configuration (4), it is possible to install the vibration damping spaces in large-amplitude regions such as regions of the platform located on both sides across a leading edge and a trailing edge of the airfoil part in the blade thickness direction, making it possible to suppress the vibration of the blade more effectively.

(5) In some embodiments, in any one of the above configurations (1) to (4), the vibration damping space is disposed nearer the platform of the cavity under the platform in a height direction of the blade.

With the above configuration (5), it is possible to install the vibration damping space nearer the platform where amplitude is larger, making it possible to suppress the vibration of the blade further effectively.

(6) In some embodiments, in any one of the above configurations (1) to (5), the housing is disposed at a position shifted to a suction-surface side or a pressure-surface side of the blade with respect to an airfoil part of the blade, in a thickness direction of the blade.

With the above configuration (6), since the vibration damping space is disposed at the position away from the airfoil part in the thickness direction of the blade where amplitude is relatively large, it is possible to enhance a vibration damping effect by the attenuation material.

In addition, with the above configuration (6), since the housing of the vibration damping device is installed at the position shifted with respect to the airfoil part of the blade, it is possible to suppress a strength decrease of the blade owing to the cavity formed under the platform to contain the housing. Thus, it is possible to avoid damage to the blade, even if a large load acts on the blade due to a centrifugal force. Thus, with the above configuration (6), it is possible to suppress the vibration of the blade without decreasing the strength of the blade.

(7) In some embodiments, in the above configuration (6), a pair of housings are disposed on the suction-surface side and the pressure-surface side of the blade, respectively, across the airfoil part of the blade in the thickness direction of the blade.

With the above configuration (7), it is possible to install the vibration damping devices on both of the suction-surface side and the pressure-surface side of the blade, making it possible to suppress the vibration of the blade more effectively.

(8) In some embodiments, in any one of the above configurations (1) to (7), the vibration damping space satisfies, for at least one edge of a leading edge or a trailing edge of the blade, one of following condition (a) or (b):
(a) the vibration damping space overlaps the edge in a chordwise direction of the blade; or
(b) in the chordwise direction, a ratio of a shift amount of the vibration damping space with respect to the edge to a chord length of the blade is at most 0.1.

With the above configuration (8), it is possible to install the vibration damping space in the vicinity of the edge (the leading edge or the trailing edge) of the blade where amplitude is large, making it possible to suppress the vibration of the blade more effectively.

(9) In some embodiments, in any one of the above configurations (1) to (8), the housing includes at least one wall member disposed in the vibration damping space, the wall member divides the vibration damping space into a plurality of regions which include a pair of regions facing each other across the wall member and communicating with each other, and the attenuation material is configured to be movable between the pair of regions.

With the above configuration (9), the pair of regions of the vibration damping space facing each other across the wall member communicate with each other, and the attenuation material is movable between the pair of regions. Thus, when the attenuation material moves from one region to the other region of the pair of regions, a friction is generated between the attenuation material and the wall member or an inner wall of the vibration damping space, making it possible to effectively absorb vibration energy of the blade. As a result, it is possible to suppress the vibration of the blade further effectively.

(10) In some embodiments, in the above configuration (9), in the vibration damping space, a minimum gap portion, where a distance between the at least one wall member and an inner wall surface of the housing defining the vibration damping space is minimum, is formed at a position farther away from an airfoil part of the blade than a center position of the housing in a thickness direction of the blade.

With the above configuration (10), the minimum gap portion is disposed at the position relatively far away from the airfoil part in the thickness direction of the blade. As a result, a friction is generated between the attenuation material, and the wall member forming the minimum gap portion and the inner wall of the vibration damping space in the vicinity of the region of the platform away from the airfoil part where amplitude is large, making it possible to suppress the vibration of the blade more effectively.

(11) In some embodiments, in the above configuration (9) or (10), in the vibration damping space, a minimum gap portion, where a distance between the at least one wall member and an inner wall surface of the housing defining the vibration damping space is minimum, is formed, and the wall member has an inclined surface inclined with respect to the inner wall surface such that the distance between the wall member and the inner wall surface increases with distance from the minimum gap portion.

With the above configuration (11), provided with the aforementioned inclined surface, one region of the pair of regions facing each other across the wall member and communicating with each other has a sufficiently ensured volume. Thus, along with the vibration of the blade, movement of the attenuation material to the region, where the inclined surface exists, through the minimum gap portion is less likely to be inhibited. As a result, it is possible to suppress the vibration of the blade further effectively.

(12) In some embodiments, in any one of the above configurations (9) to (11), the wall member includes an axial wall portion extending along a chordwise direction of the blade, and a circumferential wall portion extending along a thickness direction of the blade.

With the above configuration (12), it is possible to cope with a plurality of vibration modes including a vibration mode with a vibration in the thickness direction of the blade and a vibration mode with a vibration in the chordwise direction.

(13) In some embodiments, in any one of the above configurations (9) to (12), the wall member includes a plurality of holes for causing the pair of regions divided by the wall member to communicate with each other.

With the above configuration (13), along with the vibration of the blade, the attenuation material moves between the pair of regions divided by the wall member via the plurality of holes. Consequently, the vibration energy of the blade is absorbed by the friction between the plurality of holes and the attenuation material, making it possible to perform vibration damping on the blade further effectively.

(14) A rotating machine according to at least one embodiment of the present invention includes a blade which includes a platform and an airfoil part erected on the platform, and the vibration damping device according to any one of the above configurations (1) to (13) mounted on the blade, under the platform.

With the above configuration (14), it is possible to install the vibration damping device under the platform of the blade where a space is easily ensured, making it possible to save a space.

Moreover, even if the vibration damping device is deteriorated by heat from the rotating machine, it is possible to replace the housing in its entirety which is installed in the cavity formed under the platform of the blade, allowing easy replacement.

Thus, with the above configuration (14), it is possible to provide the rotating machine capable of suppressing the vibration of the blade, while achieving space-saving and easy replacement.

Advantageous Effects

According to some embodiments of the present invention, it is possible to provide a vibration damping device for a blade of a rotating machine which is space-saving and easily replaceable, and the rotating machine including the same.

DETAILED DESCRIPTION

Embodiments of the present invention will now be described in detail with reference to the accompanying drawings.

However, the scope of the present invention is not limited to the following embodiments. It is intended that dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

Figure 1:
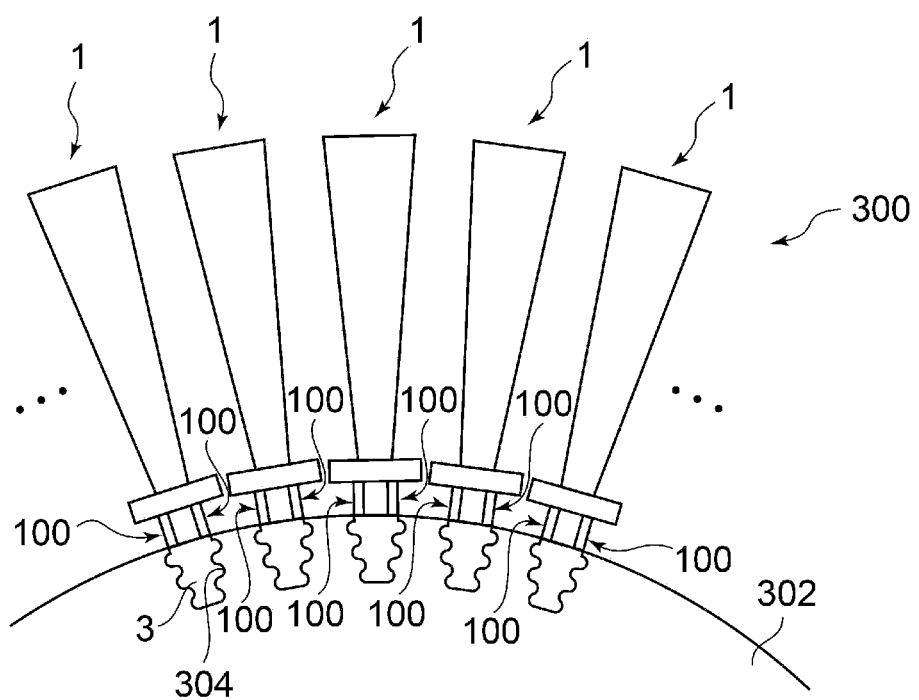
FIG. 1 is a schematic configuration view showing the configuration of a rotating machine according to an embodiment of the present invention.

FIG. 1 is a schematic configuration view showing the configuration of a rotating machine according to an embodiment of the present invention.

A rotating machine 300 shown in FIG. 1 includes blades 1 and vibration damping devices 100 mounted to the blades 1, respectively.

In an example shown in FIG. 1, the blades 1 mounted with the vibration damping devices 100, respectively, are a plurality of rotor blades arranged in the circumferential direction, and each of the rotor blades extends radially outward from an outer circumferential surface of a rotor disc 302. More specifically, each of the blades 1 (rotor blades) has a blade root part 3 which is fitted with a groove 304 disposed in the outer circumferential surface of the rotor disc 302, thereby being attached to the rotor disc 302.

The rotating machine 300 may be any rotating machine and may be, for example, a compressor, or may be an aircraft engine or a gas turbine. For example, if the rotating machine 300 is the compressor, a plurality of blades 1 are mounted on a rotational shaft of the compressor and rotate about the rotational shaft, thereby compressing air taken from the outside. On the other hand, if the rotating machine 300 is the aircraft engine or the gas turbine, the plurality of blades 1 are mounted on a rotational shaft of the aircraft engine or the gas turbine and are driven by a combustion gas.

Figure 2:
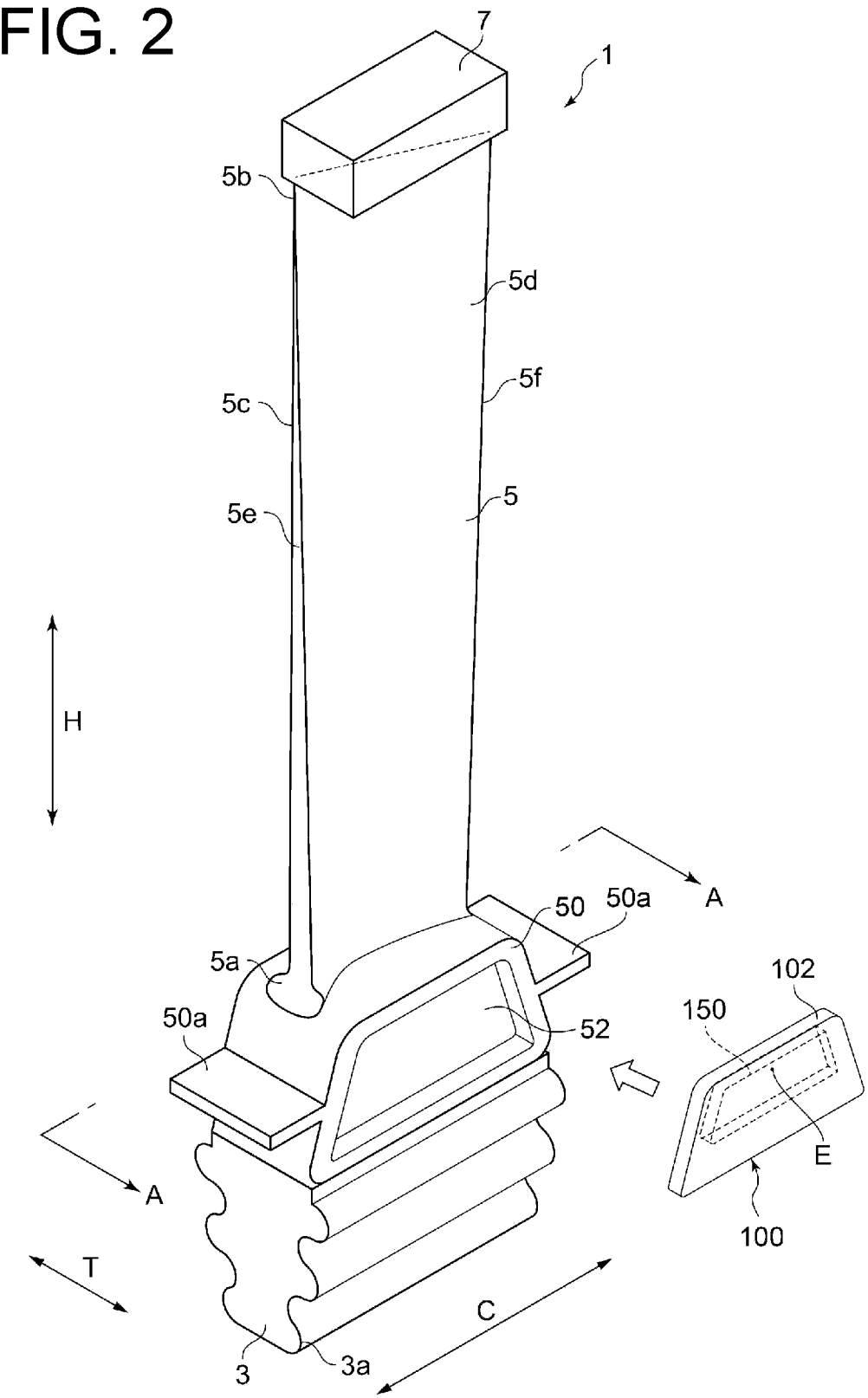
FIG. 2 is a schematic configuration view showing the configuration of a blade of the rotating machine according to an embodiment of the present invention.

FIG. 2 is a schematic configuration view showing the configuration of the blade of the rotating machine according to an embodiment of the present invention.

As shown in FIG. 2, the blade 1 includes the blade root part 3, a platform 50, an airfoil part 5, and a shroud 7.

The blade root part 3 is fitted with, for example, the groove 304 of the rotor disc 302 shown in FIG. 1, thereby fixing the blade 1 to a rotational shaft. The blade root part 3 may include a plurality of rib portions 3a protruding in a blade thickness direction T. In the blade root part 3 of the blade 1 in an embodiment shown in FIG. 2, the six rib portions 3a are formed.

The platform 50 is formed integrally with the blade root part 3. The platform 50 includes a pair of protruding portions 50a protruding forward and backward, respectively, from the blade root part 3 in a chordwise direction C of the blade 1. Under the platform 50, a cavity 52 is formed.

The chordwise direction C is a direction along a chord connecting a leading edge 5e and a trailing edge 5f of the airfoil part 5 to be described later in a base portion 5a to be described later. In an example shown in FIG. 2, the chordwise direction C substantially coincides with an insertion direction of the blade root part 3 into the groove 304. Moreover, "forward" as viewed from the blade root part 3 indicates a direction from the trailing edge 5f toward the leading edge 5e of the airfoil part 5 to be described later, and "backward" as viewed from the blade root part 3 indicates a direction from the leading edge 5e toward the trailing edge 5f. Furthermore, under the platform 50 means a side of the blade root part 3 as viewed from the platform 50 in a blade height direction H.

On the platform 50 having the above-described configuration, the airfoil part 5 is erected.

The airfoil part 5 has a suction surface (convex surface) 5c and a pressure surface (concave surface) 5d. The suction surface 5c may be formed by a convex curved surface. On the other hand, the pressure surface 5d may be formed by a concave curved surface. The suction surface 5c and the pressure surface 5d are connected to each other at the leading edge 5e and the trailing edge 5f.

The airfoil part 5 is disposed on an opposite surface to a surface of the platform 50 where the blade root part 3 is disposed, and extends along the blade height direction H on an opposite side to the blade root part 3 across the platform 50. The airfoil part 5 includes the base portion 5a fixed to the platform 50 and a tip portion 5b disposed in an end portion opposite to the base portion 5a in the height direction H of the blade 1. The airfoil part 5 may have a shape twisted with distance from the base portion 5a (that is, toward the tip portion 5b) toward the height direction H of the blade 1.

The shroud 7 is fixed to the tip portion 5b of the airfoil part 5. The respective shrouds 7 of the plurality of adjacent blades 1 may be installed to press against each other, performing friction damping on a vibration generated in rotation of the blades 1.

The vibration damping device 100 to be described later is also applicable to the blade 1 without the shroud 7.

The overall configuration of the blade 1 has been described so far.

Hereinafter, the configuration of the vibration damping device 100 installed on the blade 1 according to an embodiment of the present invention will be described with reference to FIG. 2.

The vibration damping device 100 according to an embodiment of the present invention includes at least one housing 102 which is configured to be containable in the cavity 52 formed under the platform 50 of the blade 1 having the above-described configuration and to be detachable from the blade 1, and an attenuation material disposed in a vibration damping space 150 formed inside the housing 102.

As shown in FIG. 2, the housing 102 serving as a casing of the vibration damping device 100 is formed to be containable in the cavity 52 formed under the platform 50. Furthermore, the housing 102 is detachable from the cavity 52.

The housing 102 may be disposed in the entirety of the cavity 52 or may be disposed in a part of the cavity 52. Moreover, the housing 102 may be disposed such that the entirety of the housing 102 fits in the cavity 52 or may be disposed such that a part of the housing 102 protrudes from the cavity 52.

Moreover, a pair of cavities 52 may be disposed on the side of the suction surface 5c and the side of the pressure surface 5d, respectively, as viewed from the blade root part 3, under the platform 50. In this case, a pair of housings 102 may be contained in the pair of cavities 52 disposed on the side of the suction surface 5c and the side of the pressure surface 5d, respectively.

According to the above-described embodiment, since the vibration damping space 150 provided with the attenuation material is formed inside the housing 102, it is possible to suppress the vibration of the blade 1. The attenuation material, which will be described in detail later, is, for example, powder or liquid movable in the vibration damping space 150.

Moreover, the vibration damping device 100 can be installed under the platform 50 of the blade 1 where a space is easily ensured, making it possible to save a space.

Furthermore, in case the vibration damping device 100 is exposed to a high-temperature environment during an operation of the rotating machine 300, even if the vibration damping device 100 is deteriorated by heat and the like, it is possible to detach and replace the housing 102 in its entirety which is installed in the cavity 52 formed under the platform 50 of the blade 1, allowing easy replacement.

Thus, with the above-described embodiment, it is possible to provide the vibration damping device for the blade 1 of the rotating machine 300 which is space-saving and easily replaceable.

The vibration damping space 150, which is formed inside the housing 102 having the above-described configuration, may be disposed nearer the platform 50 of the cavity 52 under the platform 50 in the blade height direction H.

As shown in FIG. 2, in some embodiments, the vibration damping space 150 is disposed such that a centroid E of the vibration damping space 150 as viewed in the blade thickness direction T is at a center position of the cavity 52 in the blade height direction H or above a center position of the housing 102 in the blade height direction H.

Thus disposing the vibration damping space 150 nearer the platform 50 in the blade height direction H of the blade 1, it is possible to install the vibration damping space 150 nearer the platform 50 where amplitude is larger, making it possible to suppress the vibration of the blade 1 further effectively.

Figure 3:
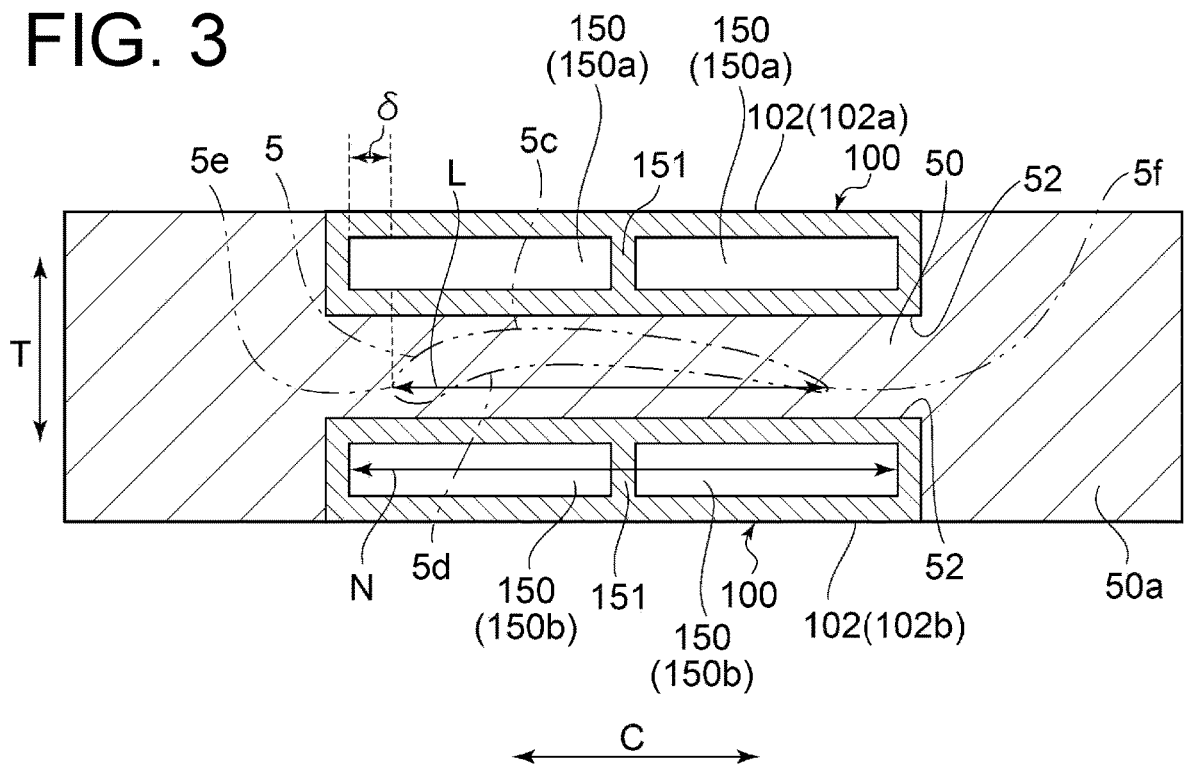
FIG. 3 is a schematic cross-sectional view of the blade taken along a line A-A according to an embodiment of the present invention.

FIG. 3 is a schematic cross-sectional view of the blade 1 taken along a line A-A according to an embodiment of the present invention.

A pair of above-described housings 102 may, respectively, be disposed on the side of the suction surface 5c and the side of the pressure surface 5d of the blade 1 across the airfoil part 5 of the blade 1 in the blade thickness direction T.

In some embodiments, the housings 102 of the vibration damping device 100 described above are disposed in the respective cavities 52 formed on both sides across the airfoil part 5 in the blade thickness direction T, as shown in FIG. 3, under the platform 50. That is, the pair of housings 102, namely, a housing 102a on the side of the suction surface 5c and a housing 102b on the side of the pressure surface 5d are disposed in the blade 1.

Furthermore, the vibration damping spaces 150 are formed in the respective housings 102, and a pair of vibration damping spaces 150, which include a vibration damping space 150a formed in the housing 102a on the side of the suction surface 5c and a vibration damping space 150b formed in the housing 102b on the side of the pressure surface 5d, are disposed in the vibration damping device 100.

Thus disposing the housings 102 on both the side of the suction surface 5c and the side of the pressure surface 5d across the airfoil part 5 in the blade thickness direction T, it is possible to suppress the vibration of the blade 1 more effectively.

Furthermore, the housing 102 having the above-described configuration may be disposed at a position shifted to the side of the suction surface 5c or the side of the pressure surface 5d of the blade 1 with respect to the airfoil part 5 of the blade 1 in the blade thickness direction T.

In an exemplary embodiment shown in FIG. 3, the respective housings 102 disposed in the cavities 52 and the airfoil part 5 do not overlap in the planar view as viewed in the blade height direction H. The entirety of the housing 102a on the side of the suction surface 5c of the airfoil part 5 is positioned to be shifted to the side of the suction surface 5c of the blade 1, and the entirety of the housing 102b on the side of the pressure surface 5d of the airfoil part 5 is positioned to be shifted to the side of the pressure surface 5d of the blade 1.

Since the housing 102 is thus disposed at the position shifted to the side of the suction surface 5c or the side of the pressure surface 5d of the blade 1 with respect to the airfoil part 5, the vibration damping space 150 is disposed at the position away from the airfoil part 5 in the blade thickness direction T where amplitude is relatively large, making it possible to enhance a vibration damping effect by the attenuation material.

In addition, since the housing 102 of the vibration damping device 100 is installed at the position shifted with respect to the airfoil part 5 of the blade 1, it is possible to suppress a strength decrease of the blade 1 owing to the cavity 52 formed under the platform 50 to contain the housing 102. Thus, it is possible to avoid damage to the blade 1, even if a large load acts on the blade 1 due to a centrifugal force. Thus, according to the above-described embodiment, it is possible to suppress the vibration of the blade 1 without decreasing the strength of the blade 1.

Moreover, the above-described housing 102 may be configured to extend along the chordwise direction C of the blade 1. The vibration damping space 150 may be formed in at least one of a region on the side of the leading edge 5e or a region on the side of the trailing edge 5f of the blade 1 of an interior space of the housing 102.

In an example shown in FIG. 3, the pair of vibration damping spaces 150 separated from each other by a partition wall 151 are formed in each of the housings 102, one of the vibration damping spaces 150 is located in the region on the side of the leading edge 5e of the interior space of the housing 102, and the other of the vibration damping spaces 150 is located in the region on the side of the trailing edge 5f of the interior space of the housing 102. In another embodiment, the vibration damping space 150 is formed only in one of the region on the side of the leading edge 5e or the region on the side of the trailing edge 5f of the interior space of the housing 102. For instance, in an example shown in FIG. 9 to be described later, the vibration damping space 150 is disposed to be located in the region on the side of the trailing edge 5f of the interior space of the housing 102, but the vibration damping space 150 is not disposed on the side of the leading edge 5e of the interior space of the housing 102.

Since the vibration damping space 150 is thus formed in the region on the side of the leading edge 5e or the region on the side of the trailing edge 5f of the interior space of the housing 102, it is possible to install the vibration damping spaces 150 in large-amplitude regions such as the regions of the platform 50 located on the both sides across the leading edge 5e and the trailing edge 5f of the airfoil part 5 in the blade thickness direction T, making it possible to suppress the vibration of the blade 1 more effectively.

In the vibration damping device 100 shown in FIG. 3, a length N of an installation range of the vibration damping space 150 along the chordwise direction C is longer than a chord length L of the airfoil part 5, and both ends of the installation range of the vibration damping space 150 extend forward and backward beyond the leading edge 5e and the trailing edge 5f of the airfoil part 5, respectively, in the chordwise direction C. Consequently, the vibration damping spaces 150 are, respectively, formed in four regions located on the both sides of the platform 50 across the leading edge 5e and the trailing edge 5f of the airfoil part 5 in the blade thickness direction T.

Furthermore, the vibration damping space 150 which is formed inside the housing 102 having the above-described configuration may satisfy, for at least one edge of the leading edge 5e or the trailing edge 5f of the blade 1, the following condition (a) or (b):
(a) the vibration damping space 150 overlaps the edge in the chordwise direction C; or
(b) in the chordwise direction C, the ratio of a shift amount of the vibration damping space 150 with respect to the edge to the chord length L is at most 0.1.

In the vibration damping device 100 shown in FIG. 3, the pair of vibration damping spaces 150 overlap the leading edge 5e and the trailing edge 5f, respectively. Furthermore, a shift amount δ between the leading edge 5e and a front-side end portion of one of the vibration damping spaces 150 in the chordwise direction C is δ<0.1 L, relative to the chord length L of the blade 1.

Since the vibration damping space 150 is thus disposed at the large-amplitude position such as the vicinity of the edge (the leading edge 5e or the trailing edge 5f) of the blade 1, it is possible to suppress the vibration of the blade 1 more effectively.

In at least one vibration damping space 150 of at least one vibration damping space 150 disposed on the side of the suction surface 5c or the side of the pressure surface 5d, the length N of the installation range of the vibration damping space 150 along the chordwise direction C may have a length of 0.9 L<N<1.1 L relative to the chord length L of the airfoil part 5.

Figure 7:
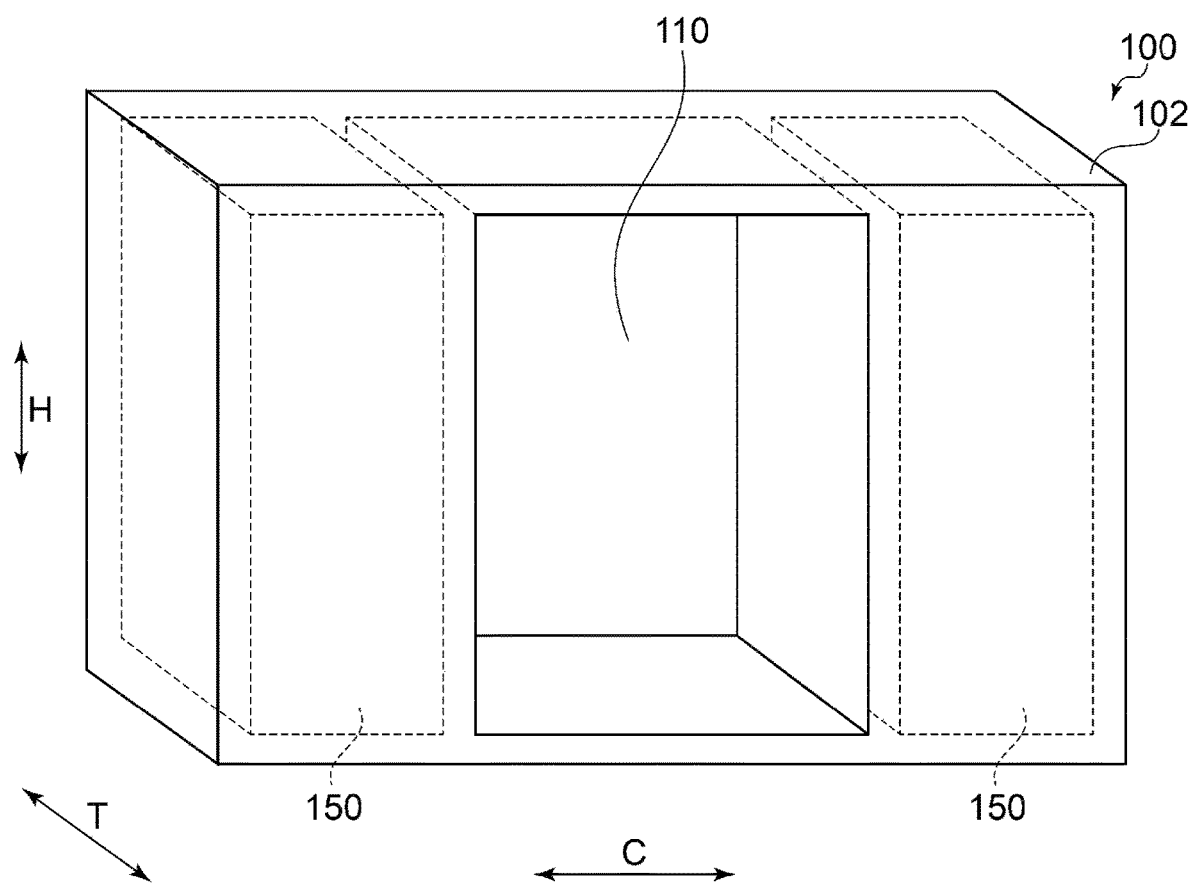
FIG. 7 is a perspective view of the vibration damping device according to another embodiment of the present invention.

Each of FIGS. 4 to 6 and FIGS. 8 to 13 is a planar view of the vibration damping device 100 according to an embodiment of the present invention, as viewed from the blade height direction H. FIG. 7 is a perspective view of the vibration damping device 100 according to an embodiment of the present invention.

The configuration of the vibration damping device 100 has been described so far.

Hereinafter, with reference to FIGS. 4 to 13, the internal configuration of the housing 102 of the vibration damping device 100 will be described. In the vibration damping device 100 illustrated in each of FIGS. 4 to 6 and FIGS. 8 to 13, the upper side of the drawing is a direction toward the blade 1 in the blade thickness direction T, and the lower side of the drawing is the direction away from the blade 1 in the blade thickness direction T.

As shown in FIGS. 4 to 13, the vibration damping space 150 is formed inside the housing 102 of the vibration damping device 100. The interior of the vibration damping space 150 is provided with an attenuation material 180.

Furthermore, as shown in FIGS. 4 to 6 and FIGS. 8 to 13, the above-described housing 102 includes at least one wall member 160 disposed in the vibration damping space 150, and each wall member 160 divides the vibration damping space 150 into a plurality of regions which include a pair of regions facing each other across the wall member 160 and communicating with each other, and the attenuation material 180 may be configured to be movable between the pair of regions.

Thus, since the pair of regions of the vibration damping space 150 facing each other across the wall member 160 communicate with each other, and the attenuation material 180 moves from one of the pair of regions to the other of the pair of regions via a communicating section, a friction is generated between the attenuation material 180 and the wall member 160 or an inner wall of the housing 102 defining the vibration damping space 150, making it possible to effectively absorb vibration energy of the blade 1. As a result, it is possible to suppress the vibration of the blade 1 further effectively.

The length, the shape, the number of disposed, a place to be disposed in the vibration damping space 150, and the like of the wall member 160 are not particularly limited. The wall member 160 has one end portion and the other end portion along the blade height direction H. Both of the one end portion and the other end portion along the blade height direction H may be connected to an inner wall surface 104 of the vibration damping space 150 in the vibration damping space 150, or at least one of the one end portion or the other end portion along the blade height direction H may be spaced apart from the inner wall surface 104 of the vibration damping space 150 at least in part.

Figure 4:
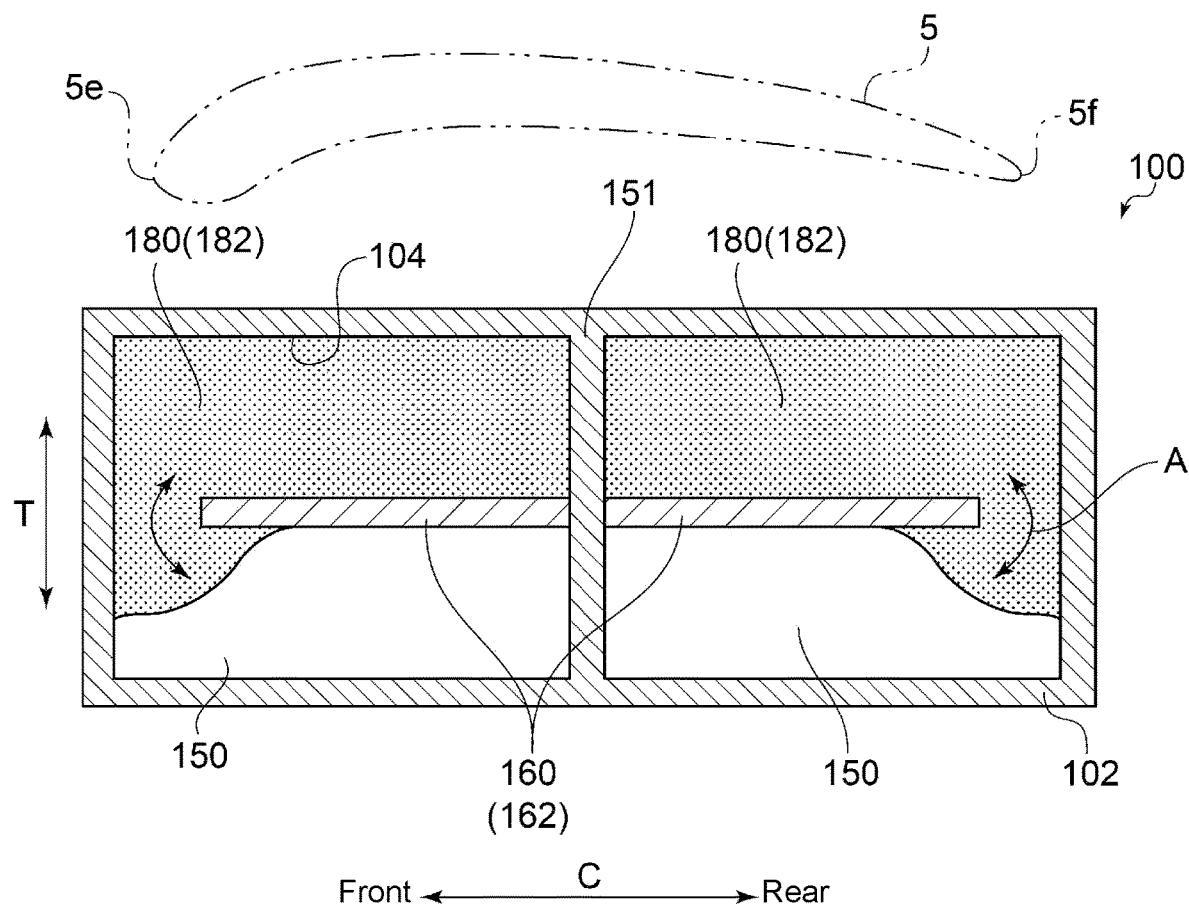
FIG. 4 is a planar view of a vibration damping device according to another embodiment of the present invention.

In the embodiment shown in FIG. 4, inside the housing 102 of the vibration damping device 100, the two vibration damping spaces 150 are formed side by side in the chordwise direction C of the blade 1 to be separated from each other by the partition wall 151, and each of the vibration damping spaces 150 is provided with one wall member 160 and the attenuation material 180. In each of the vibration damping spaces 150, the wall member 160 extends forward or backward from the partition wall 151 along the chordwise direction C. Each of the vibration damping spaces 150 is divided, by the wall member 160, into a pair of regions across the wall member 160 in the blade thickness direction T. The pair of regions divided by the wall member 160 communicate with each other in the vicinity of the front end portion or the rear end portion of the vibration damping space 150 (that is, the end portion of each vibration damping space 150 opposite to the partition wall 151) in the chordwise direction C of the blade. The attenuation material 180 moves as indicated by an arrow A between the inner wall surface 104 of the vibration damping space 150 and the tip portion of the wall member 160 in the communicating section. Thus, a friction is generated between the attenuation material 180, and the wall member 160 and the inner wall surface 104 of the vibration damping space 150, making it possible to effectively absorb the vibration energy of the blade 1.

Figure 5:
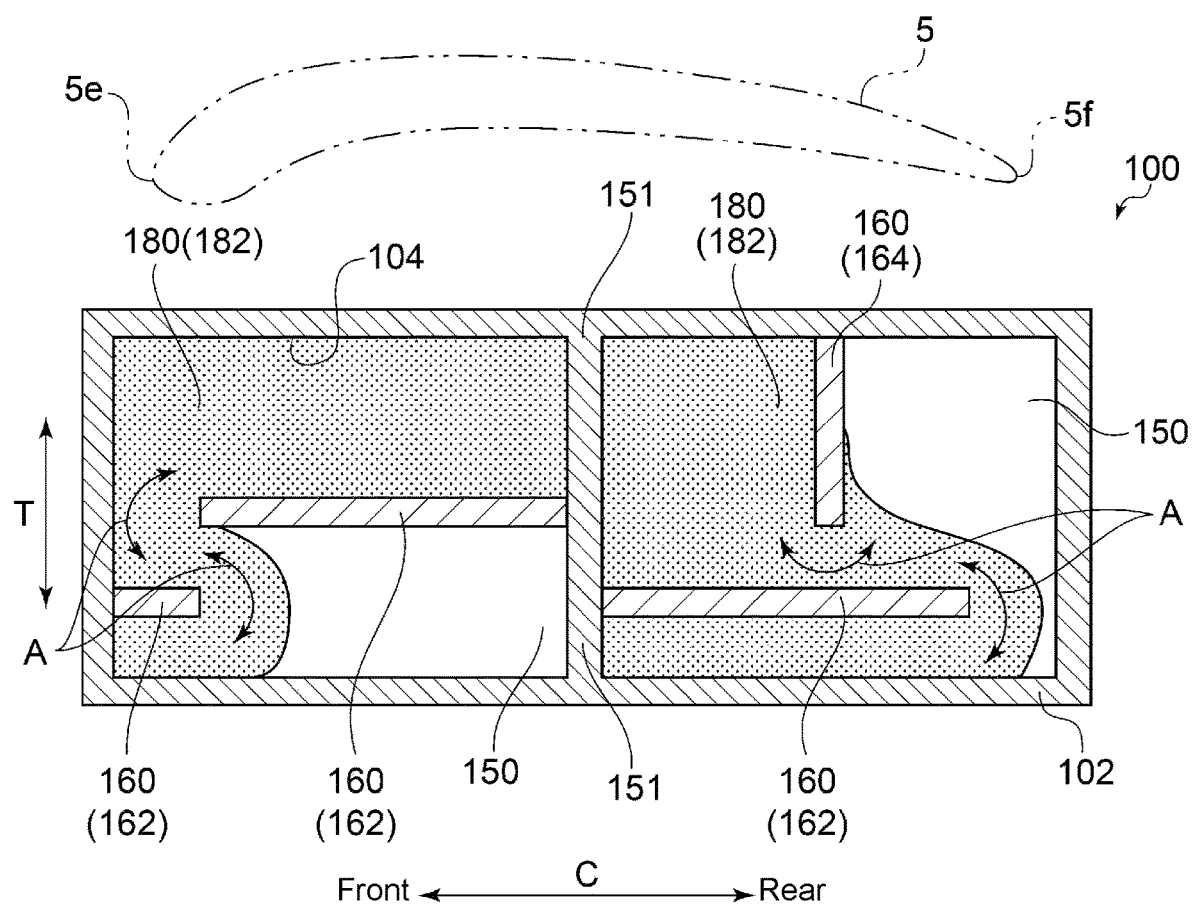
FIG. 5 is a planar view of the vibration damping device according to another embodiment of the present invention.
Figure 6:
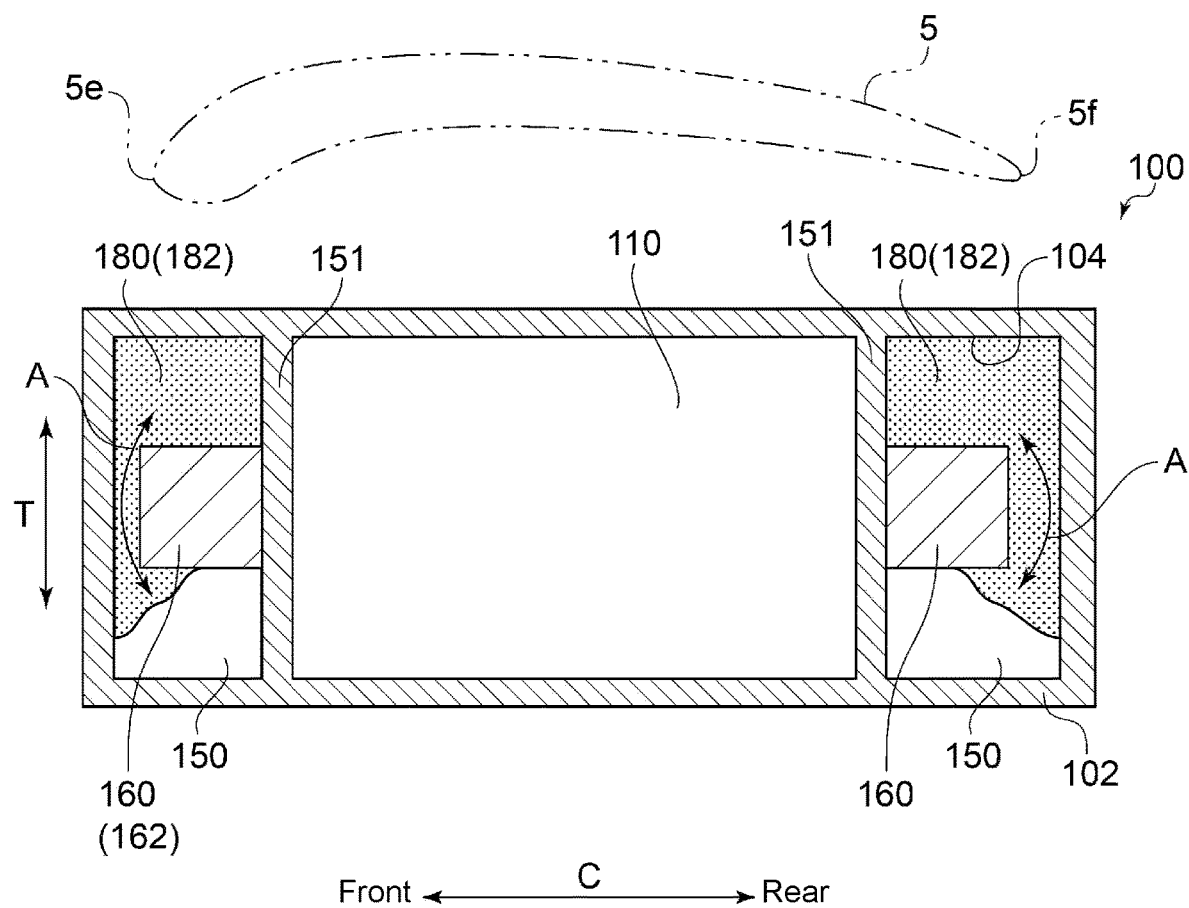
FIG. 6 is a planar view of the vibration damping device according to another embodiment of the present invention.

As shown in FIG. 5, the above-described wall member 160 may include an axial wall portion 162 extending along the chordwise direction C of the blade 1 and a circumferential wall portion 164 extending along the blade thickness direction T.

Since the wall member 160 thus extends along the chordwise direction C of the blade 1 and the blade thickness direction T, it is possible to cope with a plurality of vibration modes including a vibration mode with a vibration in the blade thickness direction T and a vibration mode with a vibration in the chordwise direction C.

In the embodiment shown in FIG. 5, inside the housing 102 of the vibration damping device 100, the two vibration damping spaces 150 are formed side by side in the chordwise direction C of the blade 1 to be separated from each other by the partition wall 151, and each of the vibration damping spaces 150 is provided with two wall members 160 and the attenuation material 180. In the front vibration damping space 150, two axial wall portions 162 extending along the chordwise direction C of the blade 1 are disposed. In the rear vibration damping space 150, one axial wall portion 162 and one circumferential wall portion 164 extending along the blade thickness direction T are disposed. The attenuation material 180 moves in the plurality of regions, which include the pair of regions facing each other across the wall member 160 and communicating with each other, as indicated by the arrows A through the communicating section. Thus, a friction is generated between the attenuation material 180, and the wall member 160 and the inner wall surface 104 of the housing 102, making it possible to effectively absorb the vibration energy of the blade 1 in the vibration mode with the vibration in the blade thickness direction T and the vibration mode with the vibration in the chordwise direction C.

Furthermore, as shown in FIGS. 6 to 10, and FIGS. 12 and 13, the housing 102 having the above-described configuration includes a space 110 formed independently from the vibration damping space 150, and the attenuation material 180 may selectively be disposed in the vibration damping space 150 of the housing 102.

Thus forming the space 110, where the attenuation material 180 is not disposed, in the housing 102, it is possible to reduce the weight of the vibration damping device 100.

The disposed position, the size, the number, and the like of the space 110 in the housing 102 are not particularly limited.

In the embodiments shown in FIGS. 6 to 8, FIG. 10, and FIGS. 12 and 13, the vibration damping spaces 150 are, respectively, disposed in a front region and a rear region of the housing 102 in the chordwise direction C, and the space 110 is disposed to be interposed between the two vibration damping spaces 150.

As shown in FIG. 7, in some embodiments, the space 110 may be formed in the housing 102 while penetrating the vibration damping device 100 in the blade thickness direction T. Moreover, in another embodiment, the space 110 may be formed in the housing 102 so as to open to any of outer wall surfaces of the housing 102, or may be formed in the housing 102 as a closed space.

Furthermore, as shown in FIGS. 8 to 13, in the vibration damping space 150 of the housing 102 having the above-described configuration, a minimum gap portion 170, where a distance between the at least one wall member 160 and the inner wall surface 104 of the housing 102 defining the vibration damping space 150 is minimum, may be formed at a position farther away from the airfoil part 5 of the blade 1 than the center position of the housing 102 in the blade thickness direction T.

Thus, since the minimum gap portion 170 is disposed at the position relatively far away from the airfoil part 5 in the blade thickness direction T, a friction is generated between the attenuation material 180, and the wall member 160 forming the minimum gap portion 170 and the inner wall surface 104 of the vibration damping space 150 in the housing 102 in the vicinity of the region of the platform 50 away from the airfoil part 5 where amplitude is large, making it possible to suppress the vibration of the blade 1 more effectively.

Figure 8:
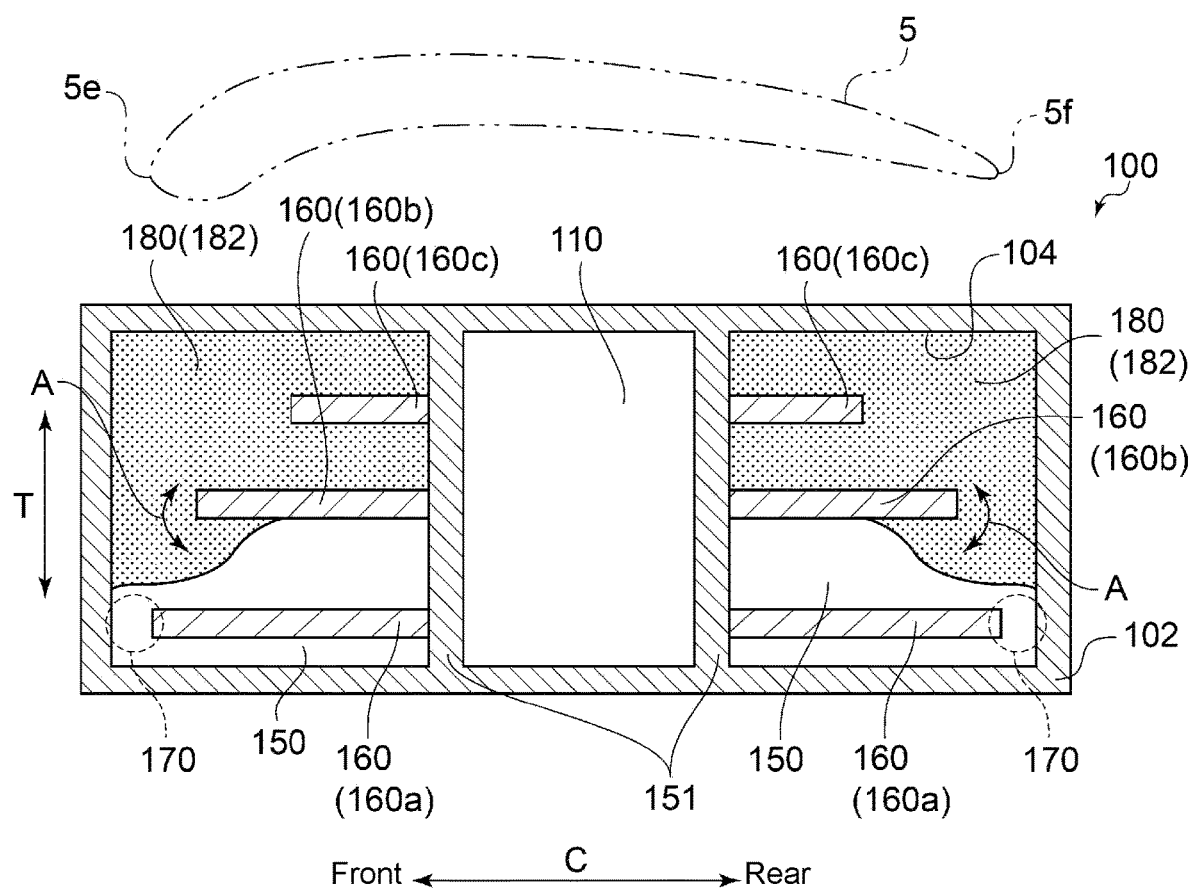
FIG. 8 is a planar view of the vibration damping device according to another embodiment of the present invention.

In the embodiment shown in FIG. 8, the vibration damping spaces 150 are, respectively, disposed on a front side and a rear side of the housing 102 in the chordwise direction C, and each of the vibration damping spaces 150 is provided with three wall members 160 and the attenuation material 180. In each of the vibration damping spaces 150, each of the wall members 160 extends forward or backward from the partition wall 151 along the chordwise direction C. The three wall members 160 provided for each of the vibration damping spaces 150 have different lengths. A longest wall member 160a is disposed on a side farthest away from the airfoil part 5 (that is, the lower side of the drawing) in the blade thickness direction T, a shortest wall member 160c is disposed on a side closest to the airfoil part 5 (that is, the upper side of the drawing) in the blade thickness direction T, and a wall member 160b having a medium length is disposed in a center region of the housing 102 in the blade thickness direction between the longest wall member 160a and the shortest wall member 160c. That is, the three wall members 160 are decreased in length toward the airfoil part 5 (that is, toward the upper side of the drawing) in the blade thickness direction T. Thus, the minimum gap portion 170, which is formed between the longest wall member 160a and the inner wall surface 104 of the vibration damping space 150, is formed at the position farther away from the airfoil part 5 of the blade 1 than the center position of the housing 102 in the blade thickness direction T. Thus forming the minimum gap portion 170 at the position away from the airfoil part 5 of the blade 1 by adjusting the length of the wall member 160, it is possible to increase a friction on the side away from the airfoil part 5 where amplitude is the largest.

It is possible to suppress the vibration of the blade 1 more effectively, as the minimum gap portion 170 is at the position away from the blade 1 inside the vibration damping space 150 of the housing 102.

Moreover, as shown in FIGS. 9 and 10, and FIGS. 12 and 13, the wall member 160 may have an inclined surface 166 inclined with respect to the inner wall surface 104 of the housing 102 such that a distance between the wall member 160 and the inner wall surface 104 of the housing 102 increases with distance from the above-described minimum gap portion 170.

Since the inclined surface 166 is disposed, one region 153 of a pair of regions facing each other across the wall member 160 and communicating with each other has a sufficiently ensured volume. Thus, along with the vibration of the blade 1, movement of the attenuation material 180 to the region 153, where the inclined surface 166 exists, through the minimum gap portion 170 is less likely to be inhibited. As a result, it is possible to suppress the vibration of the blade 1 further effectively.

Figure 9:
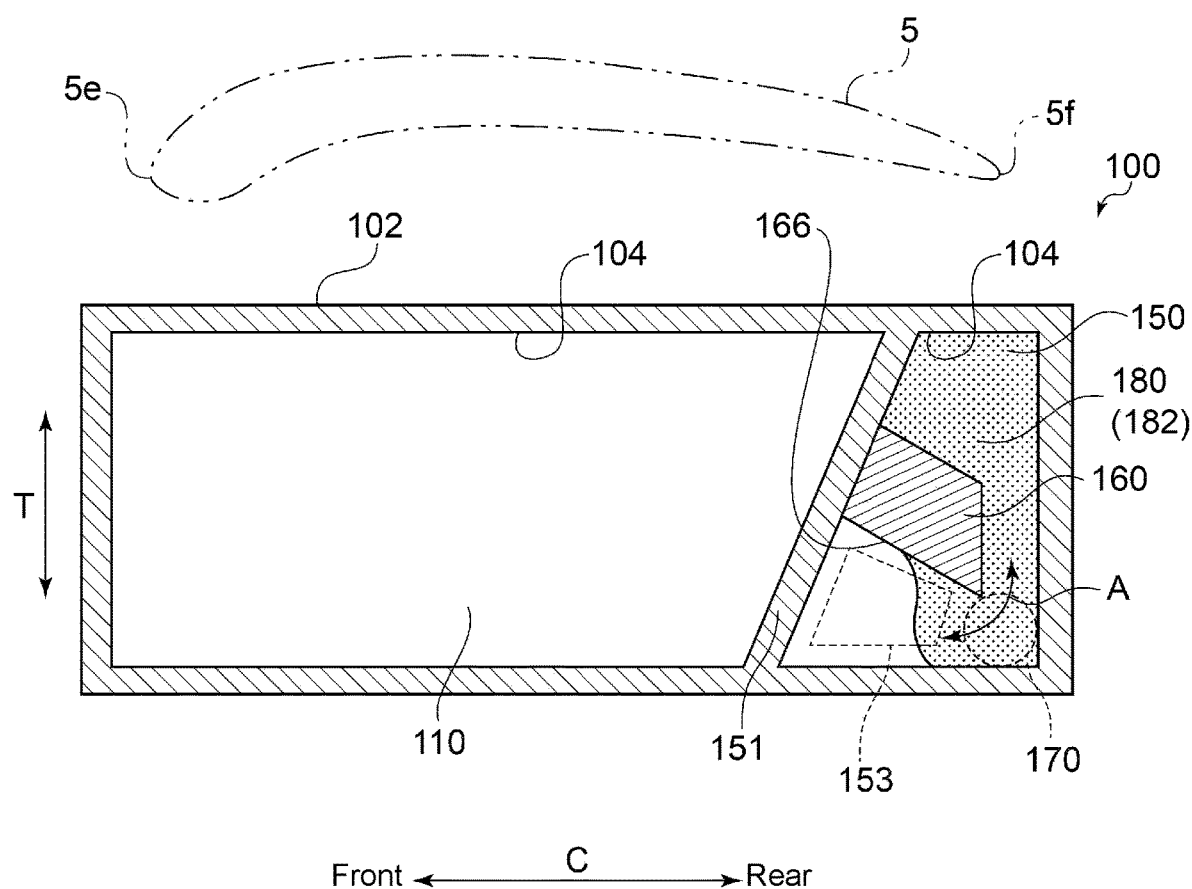
FIG. 9 is a planar view of the vibration damping device according to another embodiment of the present invention.

In the embodiment shown in FIG. 9, the housing 102 includes the vibration damping space 150 on the rear side thereof and includes the space 110 on the front side thereof, in the chordwise direction C. The vibration damping space 150 is provided with one wall member 160 and the attenuation material 180. The wall member 160 extends toward a corner of the housing 102 obliquely toward a direction away from the airfoil part 5 (that is, the lower side of the drawing). The minimum gap portion 170 is formed between a tip of the wall member 160 and the inner wall surface of the vibration damping space 150 at the corner of the housing 102.

The wall member 160 has the inclined surface 166 which is inclined with respect to the inner wall surface 104 of the vibration damping space 150 disposed in the direction away from the airfoil part 5 of the housing 102 such that the distance between the wall member 160 and the inner wall surface 104 increases as a distance between the tip of the wall member 160 (and the minimum gap portion 170) and a side surface facing the inner wall surface 104 (that is, a side surface of both side surfaces of the wall member 160 opposite to the airfoil part 5) increases, in the blade thickness direction T.

As compared with a case in which the side surface of the wall member 160 is parallel to the inner wall surface 104, with the inclined surface 166 inclined with respect to the inner wall surface 104, the volume of the region 153 formed between the inner wall surface 104 and the inclined surface 166 of the wall member 160 increases, and movement of the attenuation material 180 to the region 153 via the minimum gap portion 170 (see the arrow A) is less likely to be inhibited.

Figure 10:
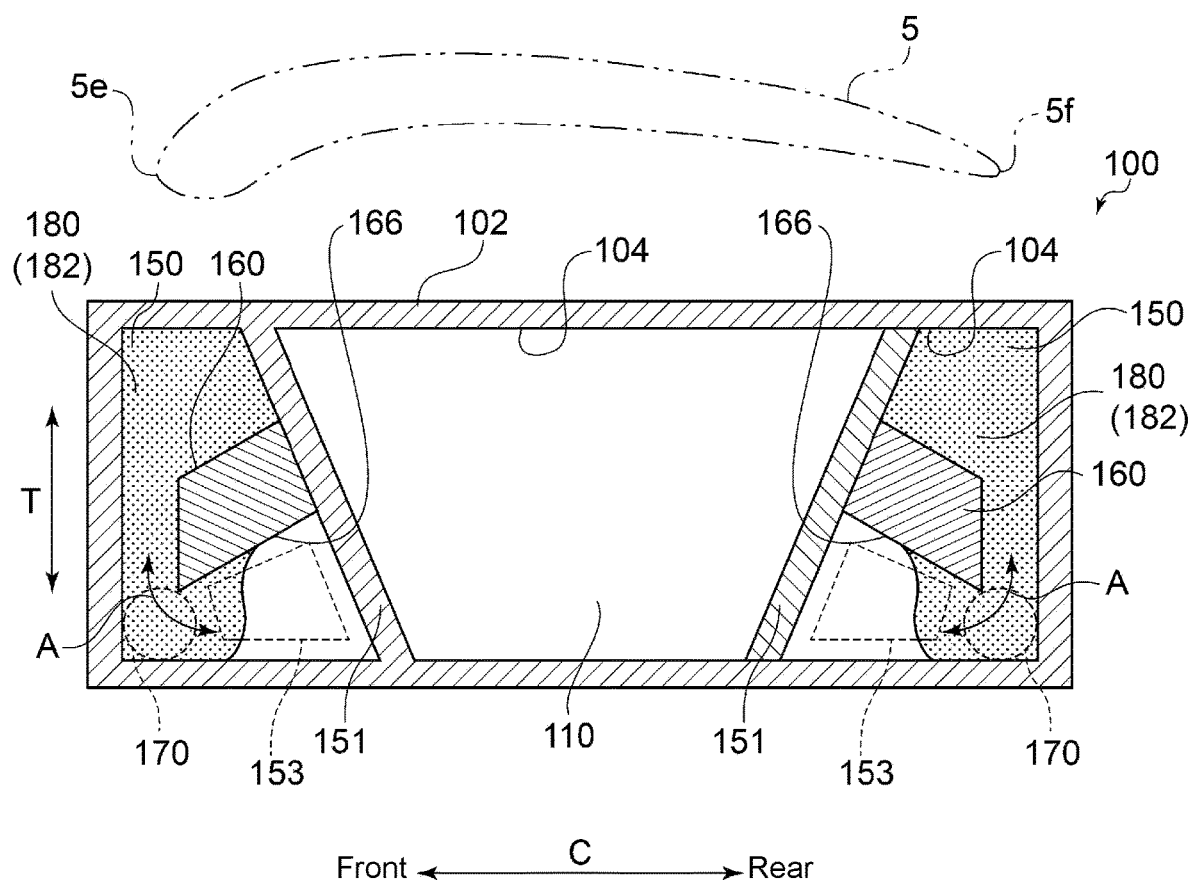
FIG. 10 is a planar view of the vibration damping device according to another embodiment of the present invention.

In another embodiment shown in FIG. 10, the vibration damping spaces 150 are, respectively, disposed on the front side and the rear side of the housing 102 in the chordwise direction C, and the space 110 is disposed to be interposed between the two vibration damping spaces 150. Each of the vibration damping spaces 150 is provided with one wall member 160 and the attenuation material 180. As with FIG. 9, each of the wall members 160 extends toward the corner of the housing 102 obliquely toward the direction away from the airfoil part 5 (that is, the lower side of the drawing).

Figure 11:
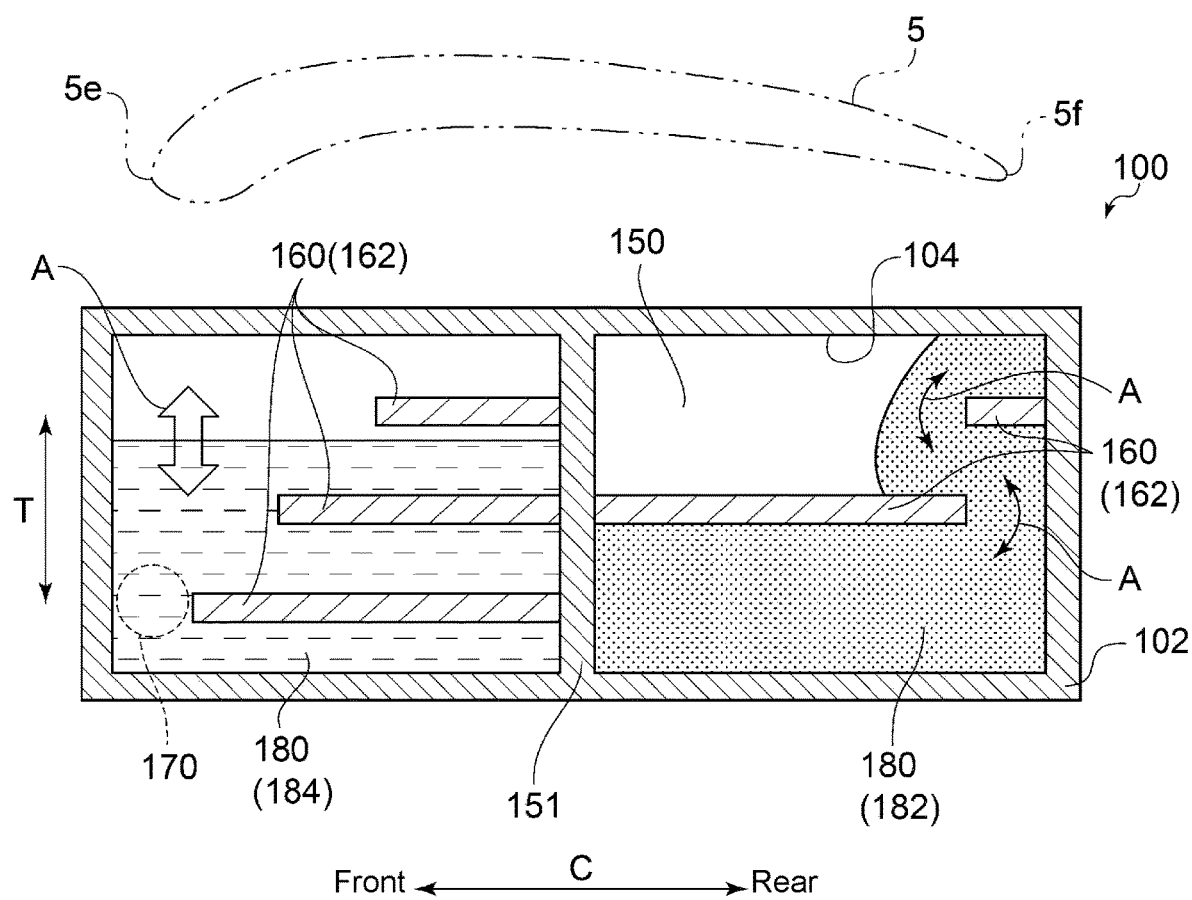
FIG. 11 is a planar view of the vibration damping device according to another embodiment of the present invention.
Figure 12:
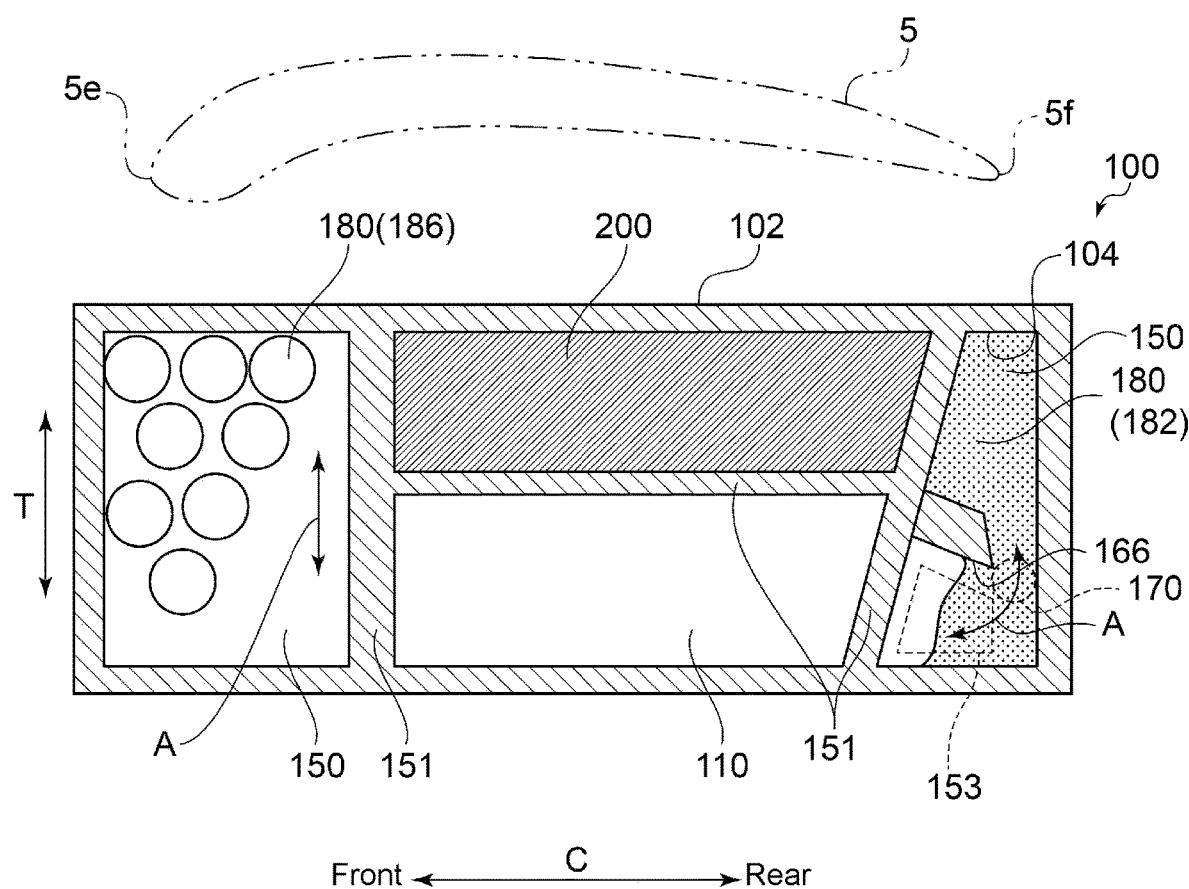
FIG. 12 is a planar view of the vibration damping device according to another embodiment of the present invention.

The type of attenuation material 180 provided for the vibration damping space 150 having the above-described configuration is not particularly limited. The attenuation material 180 may be powder 182 as shown in FIGS. 4 to 6 and FIGS. 8 to 13, may be liquid 184 as shown in FIG. 11, or may be a sphere 186 as shown in FIG. 12. When the powder 182 is used as the attenuation material 180, the type of powder 182 is not particularly limited, but may be a nickel alloy or may be stainless steel. Moreover, the particle size of the powder 182 is not particularly limited, either, but may be 100 to 300 µm. The particle size of the powder 182 indicates a median size (d50) which is obtained from the distribution of a particle size measured from a particle image. Furthermore, the filling rate of the attenuation material 180 to the volume of the vibration damping space 150 is not particularly limited, but may be about 60% to 70% at which the freedom of the attenuation material 180 is ensured, and a friction attenuation effect can sufficiently be exerted.

Figure 13:
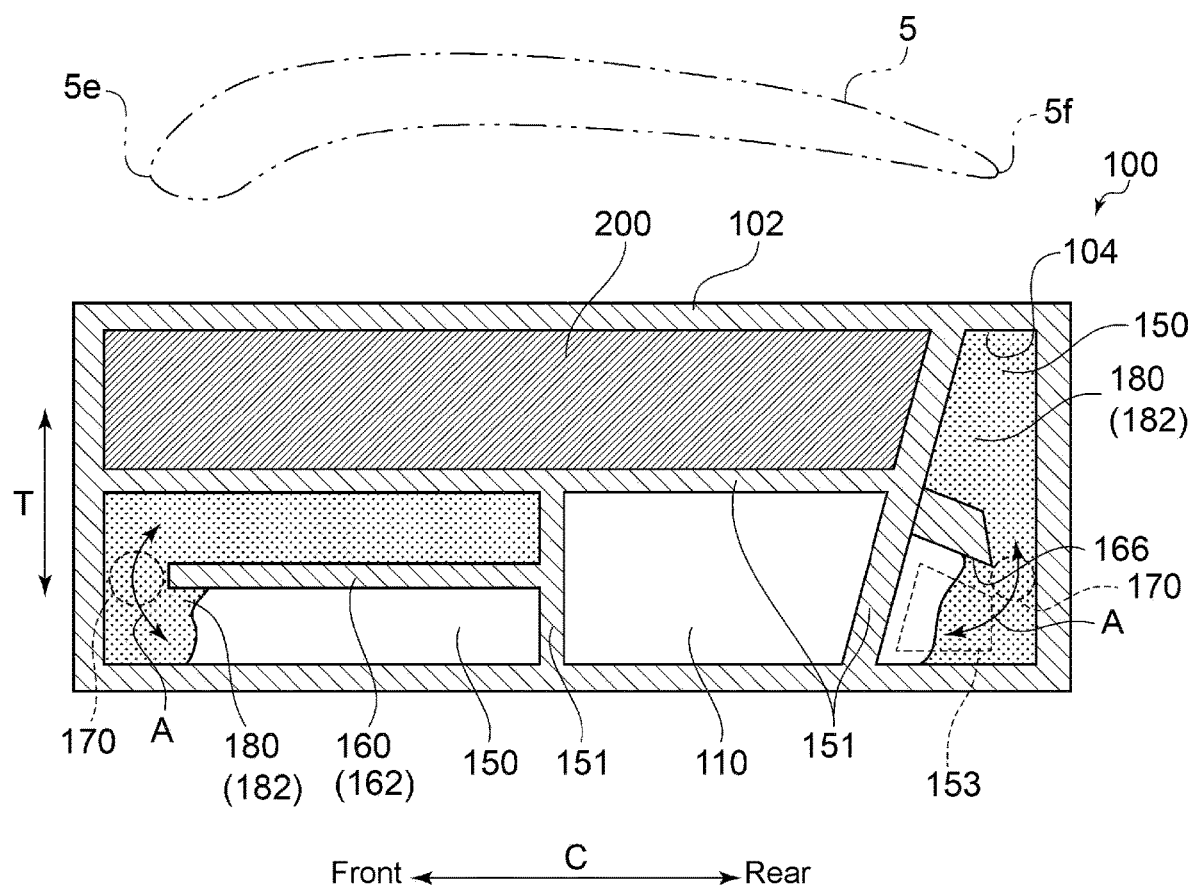
FIG. 13 is a planar view of the vibration damping device according to another embodiment of the present invention.

As shown in FIGS. 12 and 13, the housing 102 may further include a heavy member 200 configured to be detachable from the housing 102. The heavy member 200 is made of a material higher in density than the above-described attenuation material 180.

Providing the vibration damping device 100 with the heavy member 200 configured to be detachable from the housing 102, it is possible to adjust the natural frequency of each blade 1 of the rotating machine 300 by changing the heavy member 200 (so-called mistuning), and to suppress flutter.

A slot may be disposed in the housing 102, and the heavy member 200 may be configured to be detachable by being inserted into the slot.

In the embodiments shown in FIGS. 12 and 13, the heavy member 200 is disposed, in addition to the vibration damping space 150 and the space 110.

The vibration damping space 150, the space 110, and the heavy member 200 are not particularly limited in arrangement, size, and the like in the housing 102.

Figure 14:
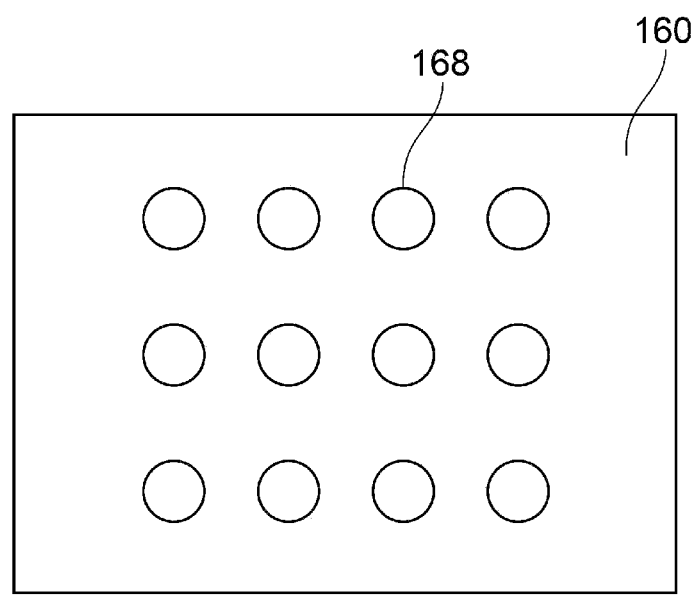
FIG. 14 is a schematic view of a wall member according to an embodiment of the present invention.

FIG. 14 is a schematic view of the wall member 160 according to an embodiment of the present invention.

The wall member 160, which is disposed in the vibration damping space 150 having the above-described configuration, may include a plurality of holes 168 for causing the pair of regions divided by the wall member 160 to communicate with each other.

In the embodiment shown in FIG. 14, each of the holes 168 of the wall member 160 is shown as a circular. However, the hole 168 is not particularly limited to a circular shape, but may be a polygonal shape. Moreover, the hole 168 of the wall member 160 close to a portion of the blade 1 where amplitude is large may have a complicated shape. Thus, a friction between the attenuation material 180 and the hole 168 may be increased to perform vibration damping on the blade 1 more effectively.

Disposing the plurality of holes 168 in the wall member 160, along with the vibration of the blade 1, the attenuation material 180 moves between the pair of regions divided by the wall member 160 via the plurality of holes 168. Consequently, the vibration energy of the blade 1 is absorbed by the friction between the plurality of holes 168 and the attenuation material 180, making it possible to perform vibration damping on the blade 1 further effectively.

The embodiments of the present invention have been described above. However, the present invention is not limited thereto, and various modifications may be applied as long as they do not depart from the object of the present invention.

REFERENCE SIGNS LIST

1 Blade
3 Blade root part

5 Airfoil part
7 Shroud
50 Platform
52 Cavity
100 Vibration damping device
102 Housing
110 Space
150 Vibration damping space
160 Wall member
170 Minimum gap portion
180 Attenuation material
200 Heavy member
C Chordwise direction
T Blade thickness direction
H Blade height direction
L Chord length

The invention claimed is:

1. A vibration damping device for a blade of a rotating machine, the device comprising:
  at least one housing configured to be containable in a cavity formed under a platform of the blade, and to be detachable from the blade; and
  an attenuation material disposed in a vibration damping space formed inside the housing,
  wherein the housing includes at least one wall member disposed in the vibration damping space,
  wherein the wall member divides the vibration damping space into a plurality of regions which include a pair of regions facing each other across the wall member and communicating with each other,
  wherein the attenuation material is configured to be movable between the pair of regions, and
  wherein, in the vibration damping space, a minimum gap portion, where a distance between the at least one wall member and an inner wall surface of the housing defining the vibration damping space is minimum, is formed at a position farther away from an airfoil part of the blade than a center position of the housing in a thickness direction of the blade.

2. A rotating machine, comprising:
  a blade which includes a platform and an airfoil part erected on the platform; and
  the vibration damping device according to claim 1 mounted on the blade, under the platform.

3. A vibration damping device for a blade of a rotating machine, the device comprising:
  at least one housing configured to be containable in a cavity formed under a platform of the blade, and to be detachable from the blade; and
  an attenuation material disposed in a vibration damping space formed inside the housing,
  wherein the housing includes at least one wall member disposed in the vibration damping space,
  wherein the wall member divides the vibration damping space into a plurality of regions which include a pair of regions facing each other across the wall member and communicating with each other, and
  wherein the attenuation material is configured to be movable between the pair of regions,
  wherein, in the vibration damping space, a minimum gap portion, where a distance between the at least one wall member and an inner wall surface of the housing defining the vibration damping space is minimum, is formed, and
  wherein the wall member has an inclined surface inclined with respect to the inner wall surface such that the distance between the wall member and the inner wall surface increases with distance from the minimum gap portion.

4. A vibration damping device for a blade of a rotating machine, the device comprising:
  at least one housing configured to be containable in a cavity formed under a platform of the blade, and to be detachable from the blade; and
  an attenuation material disposed in a vibration damping space formed inside the housing,
  wherein the housing includes at least one wall member disposed in the vibration damping space,
  wherein the wall member divides the vibration damping space into a plurality of regions which include a pair of regions facing each other across the wall member and communicating with each other,
  wherein the attenuation material is configured to be movable between the pair of regions, and
  wherein the wall member includes:
    an axial wall portion extending along a chordwise direction of the blade; and
    a circumferential wall portion extending along a thickness direction of the blade.

* * * * *